(12) United States Patent
Dixon

(10) Patent No.: US 8,603,556 B2
(45) Date of Patent: Dec. 10, 2013

(54) FRIED-CHUNK FOOD COMPOSITIONS

(75) Inventor: Dan K. Dixon, St. Louis, MO (US)

(73) Assignee: NESTEC S.A., Vevey (CH)

( * ) Notice: Subject to any disclaimer, the term of this patent is extended or adjusted under 35 U.S.C. 154(b) by 106 days.

(21) Appl. No.: 13/138,068

(22) PCT Filed: Dec. 30, 2009

(86) PCT No.: PCT/US2009/006748
§ 371 (c)(1),
(2), (4) Date: Jun. 29, 2011

(87) PCT Pub. No.: WO2010/077357
PCT Pub. Date: Jul. 8, 2010

(65) Prior Publication Data
US 2011/0268849 A1    Nov. 3, 2011

Related U.S. Application Data

(60) Provisional application No. 61/204,190, filed on Jan. 2, 2009.

(51) Int. Cl.
*A23L 3/3454* (2006.01)
*A23K 1/18* (2006.01)

(52) U.S. Cl.
USPC ............. 426/89; 426/310; 426/520; 426/574; 426/805; 426/656

(58) Field of Classification Search
USPC ................... 426/89, 310, 656, 805, 520, 574
See application file for complete search history.

(56) References Cited

U.S. PATENT DOCUMENTS

| 3,202,514 A | * | 8/1965 | Burgess et al. | 426/532 |
| 4,006,266 A | * | 2/1977 | Bone et al. | 426/623 |
| 4,190,679 A | * | 2/1980 | Coffee et al. | 426/623 |
| 5,869,121 A | * | 2/1999 | Brescia et al. | 426/281 |
| 2007/0128336 A1 | * | 6/2007 | Saylock et al. | 426/635 |
| 2007/0292594 A1 | * | 12/2007 | Levin | 426/656 |

FOREIGN PATENT DOCUMENTS

WO    WO 2007093430 A1 *  8/2007

* cited by examiner

*Primary Examiner* — Chhaya Sayala
(74) *Attorney, Agent, or Firm* — Julie M. Lappin; Janet E. Reed

(57) ABSTRACT

The invention provides fried-chunk food compositions comprising (1) food chunks that have been fried in oil at a temperature of from about 110 to 205° C. to produce fried food chunks having a moisture content of about 16% and an Aw of about 0.7 and (2) from about 5 to about 35% plasticizer applied to the fried food chunks, wherein the fried food chunks with applied plasticizer have a moisture content of about 12% or less and an Aw of about 0.65 or less. The compositions are made without using preservatives, have a desirable texture and appealing meat-like appearance, and are shelf-stable and therefore do not spoil due to unwanted microbial growth.

6 Claims, No Drawings

FRIED-CHUNK FOOD COMPOSITIONS

CROSS REFERENCE TO RELATED APPLICATIONS

This application is a national stage application under 35 U.S.C. §371 of PCT/US2009/006748 filed Dec. 30, 2009, which claims priority to U.S. Provisional Application Ser. No. 61/204,190 filed Jan. 2, 2009, the disclosures of which are incorporated herein by reference.

BACKGROUND OF THE INVENTION

1. Field of the Invention

The invention relates generally to food compositions and particularly to fried-chunk food compositions.

2. Description of Related Art

Fried-chunk food compositions are typically produced by heating food chunks in oil at a temperature of about 110 to 205° C. To produce fried food chunks that will not be susceptible to unwanted microbial growth that spoils the chunks (i.e., shelf-stable food chunks), the food chunks must be fried until the food chunks have a moisture content of about 12% or less and an Aw of about 0.65 or less. The problem is that frying the food chunks sufficiently to obtain the desirable moisture content and Aw produces food chunks with an undesirable texture and an unappealing appearance, e.g., the food chunks are hard, have sharp edges, and do not have a meat-like appearance (the chunks do not resemble actual meat). Current techniques for overcoming these problems involve adding water to the fried food chunks. The added water alters the texture and produces more appealing food chunks, e.g., increases the softness (reduces the hardness), reduces the sharp edges, and makes the food chunks look more like actual meat. This solution, however, introduces a new set of problems. The fried food chunks with added water have a higher moisture content and a higher Aw, typically a moisture content of about 16% and an Aw of about 0.7. This increase in moisture content and Aw increases the likelihood of undesirable microbial growth that spoils the food chunks. To decrease the likelihood of unwanted microbial growth and spoilage, preservatives are usually added to the fried food chunks. Such preservatives may be seen as an undesirable component of fried-chunk food compositions. There is, therefore, a need for new fried-chunk food compositions that retain a desirable texture and appearance without the use of water and preservatives and methods for making such compositions.

SUMMARY OF THE INVENTION

It is, therefore, an object of the invention to provide new fried-chunk food compositions.

It is another object of the invention to provide new methods for making new fried-chunk food compositions.

It is a further object of the invention to provide blended food compositions comprising fried-chunk food compositions and one or more other comestible ingredients.

One or more of these or other objects are achieved using novel fried-chunk food compositions comprising (1) food chunks that have been fried in oil at a temperature of from about 110 to 205° C. to produce fried food chunks having a moisture content of about 16% and an Aw of about 0.7 and (2) from about 5 to about 35% plasticizer applied to the fried food chunks, wherein the fried food chunks with applied plasticizer have a moisture content of about 12% or less and an Aw of about 0.65 or less. The novel fried-chunk food compositions are made by (1) frying food chunks in an oil at a temperature of from about 110 to 205° C. to produce fried food chunks having a moisture content of about 16% and an Aw of about 0.7; and (2) applying from about 5 to about 35% plasticizer to the fried food chunks to produce fried-chunk food compositions that have a moisture content of about 12% or less and an Aw of about 0.65 or less. The fried-chunk food compositions are mixed or otherwise combined With one or more comestible ingredients to produce blended food compositions.

Other and further objects, features, and advantages of the present invention will be readily apparent to those skilled in the art.

DETAILED DESCRIPTION OF THE INVENTION

Definitions

The term "animal" means any animal that could benefit from or enjoy the consumption of the food compositions of the present invention, including human, avian, bovine, canine, equine, feline, hicrine, lupine, murine, ovine, or porcine animals.

The term "companion animal" means domesticated animals such as cats, dogs, rabbits, guinea pigs, ferrets, hamsters, mice, gerbils, horses, cows, goats, sheep, donkeys, pigs, and the like.

The term "food composition" means a product or composition that is intended for ingestion by an animal.

The term "shelf-stable" means a product can be safely stored and sold in a sealed container at room temperature while still having a shelf life of 12 months.

The term "Aw" means water activity.

All percentages expressed herein are by weight of the total weight of the composition unless expressed otherwise.

Ranges are used herein as shorthand to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a supplement", "a method", or "a food" includes a plurality of such "supplements", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed herein are not limited to particular methodologies, protocols, and reagents because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides fried-chunk food compositions. The compositions comprise (1) food chunks that have been fried in oil at a temperature of from about 110 to 205° C. to produce fried food chunks having a moisture content of about 16% and an Aw of about 0.7 and (2) from about 5 to about 35% plasticizer applied to the fried food chunks, wherein the fried food chunks with applied plasticizer have a moisture content of about 12% or less and an Aw of about 0.65 or less. In various embodiments, the fried food chunks have a moisture content of from about 6 to about 12% and an Aw of from about 0.4 to about 0.65.

The invention is based upon the discovery that (1) frying food chunks until they have a moisture content of about 16% and an Aw of about 0.7 avoids the problems incurred when food chunks are fried until they have a moisture content of about 12% and an Aw of about 0.65 (e.g., the hardness, sharp edges, and undesirable appearance) and (2) adding a plasticizer to the fried food chunks in amounts sufficient to obtain a final moisture content of about 12% or less and an Aw of about 0.65 or less produces fried food chunks that are not susceptible to spoilage by unwanted microbial growth. Also, the fried food chunks have a desirable texture, have an appealing meat-like appearance, and are self-stable. Further, the fried food chunks do not require any added water to alter texture (e.g., increase softness) or preservatives to prevent unwanted microbial growth.

The chunks can be any suitable chunks known to skilled artisans. Any real meat chunk (beef, pork, chicken, duck, rabbit, mutton, fish, or any other type of meat), meat analog chunk, vegetable chunk, or combinations thereof are useful in the present invention. The chunks can contain meat, meat by-products, cereals, vegetable protein extracts, and the like. Chunk compositions and method for manufacturing chunks useful in the present invention are described in U.S. Pat. Nos. 4,781,939, 6,649,206, 6,767,573, 5,132,137, 5,567,466, 6,436,463 (EP1294237B1), U.S. Pat. Nos. 6,379,738, and 7,344,745. Examples of chunk formulations useful in the invention are shown in Tables 1, 2, and 3.

TABLE 1

General Formulation

| CHUNK: | Range (%) | Preferred (%) |
| --- | --- | --- |
| Meat/By-Products | 45-85 | 60-70 |
| Wheat Gluten, Vegetable, Egg, Dairy, Animal Proteins | 13-40 | 22-27 |

TABLE 1-continued

General Formulation

| CHUNK: | Range (%) | Preferred (%) |
| --- | --- | --- |
| Vitamins, Minerals, Supplements | 1-1.5 | 1.0-1.5 |
| Glycine | 0-2.0 | 0.5-1.5 |
| Glucose (Reducing Sugars) | 0-2.0 | 0.5-1.5 |
| Color | 0-0.2 | 0-0.2 |
| Water | 0-15 | 5-10 |
| Total | 100% | 100% |

TABLE 2

Fish Formulation

| CHUNK: | Range (%) | Preferred (%) |
| --- | --- | --- |
| Whole Fish/Fish Loins, Fish Scrap | 40-80 | 50-60 |
| Wheat Gluten, Vegetable, Egg, Dairy, Animal Proteins, | 15-40 | 18-24 |
| Vitamins, Minerals, Supplements | 1-1.5 | 1.0-1.5 |
| Fish Oil | 0-6.0 | 1.0-3.0 |
| Color | 0-1.0 | 0-1.0 |
| Water | 0-35 | 10-20 |
| Total | 100% | 100% |

TABLE 3

Chicken Formulation

| CHUNK: | Range (%) | Preferred (%) |
| --- | --- | --- |
| Whole Chicken/By-Products Poultry/By-Products | 40-80 | 55-65 |
| Wheat Gluten, Vegetable, Egg, Dairy Animal Proteins | 20-35 | 22-27 |
| Vitamins, Minerals, Supplements | 1.0-2.0 | 1-2 |
| Glycine | 0-2.0 | 0.5-1.5 |
| Reducing Sugar | 0-2.0 | 0-1.25 |
| Color | 0-1.0 | 0.2-0.5 |
| Water | 0-10.0 | 5-8 |
| Total | 100% | 100% |

Previously, these food chunks were fried in oil to produce food chunks having a moisture content of about 12% or less and an Aw of about 0.65 or less. Generally, these chunks, with relatively low moisture content and Aw, were shelf-stable and not susceptible to unwanted microbial growth. However, these chunks were relatively hard, had sharp edges, and did not have a realistic meat-like appearance. To solve this problem, water was added, typically in amounts of about up to about 8%, generally from about 2% to about 6%. Unfortunately, the added water increased the likelihood that the chunks would have unwanted microbial growth, i.e., the chunks would not be shelf-stable and would spoil prematurely. To avoid spoilage, preservatives were added.

Typically, mold inhibitors such as sorbates and propionates were added in amounts required, to make the compositions shelf-stable. Also, preservatives such as butylated hydroxyanisole (BHA), butylated hydroxytoluene (BHT), ethoxyquin, tocopherols (vitamin E), ascorbic acid (vitamin C), citric acid, and rosemary were added in amounts required to make the compositions shelf-stable. The compounds were added in amounts required to keep the compositions shelf stable, generally in amounts of up to 2%, typically from about 0.1 to about 1.5%. Similarly, acidification to a pH of from about 4 to 4.8 (with any food grade acid such as phosphoric acid) was used to control unwanted microbial growth.

In contrast, the fried-chunk food compositions of the present invention are fried in oil to produce food chunks having a moisture content of about 16% and, an Aw of about 0.7. These chunks are relatively soft, do not have sharp edges, and have a realistic meat-like appearance. Then, one or more plasticizers are added to the fried chunks in amounts sufficient to produce fried chunks having a moisture content of about 12% or less and an Aw of about 0.65 or less. No water is added; no preservatives are needed; the compositions have a desirable texture and appealing meat-like appearance; and the resulting chunks are shelf-stable and therefore do not spoil due to unwanted microbial growth.

When blended with baked treats, extruded treats or other food compositions, the chunks vary in size depending upon the animal that will consume the product, e.g., the type, age, health, or size of the animal and upon the intended use of the compositions. For example, chunk sizes suitable for dogs typically range from about 10 to 80 millimeters (mm), preferably 20 to 40 mm, on the longest side. Chunk sizes for cats typically range from 3 to 30 mm, preferably 8 to 20 mm, on the longest side. When the chunks are for use alone, without blending, the chunks can be any size suitable for the intended use or animal. The size is limited only by aesthetics, consumer appeal, convenience, and the like.

The plasticizer can be any plasticizer that has humectant properties and that is compatible with the food chunks. In one embodiment, the plasticizer is a polyol. In preferred embodiments, the plasticizer is glycerol (glycerin), sorbitol, propylene glycol, butylene glycol, or polydextrose.

The plasticizer is applied to the food chunks in amounts of from about 5 to about 35%, preferably from about 10 to about 30%, more preferably from about 12 to about 20%.

The oil can be any oil suitable for frying food chunks. Useful oils include animal or vegetable frying fats or oils. In one embodiment, beef tallow is used as the oil. Other animal fats and oils include lard, rendered pork fat, poultry fat, sheep tallow, hydrogenated fish oil, partially hydrogenated fish oil, or combinations thereof. Vegetable oils and fats include vegetable shortening from hydrogenated or partially hydrogenated vegetable oils (Crisco®). Vegetable oils and fats also include oils from cottonseed, soybean, linseed, coconut, palm, palm kernel, canola, sunflower, safflower, corn, peanut, sesame, olive, walnut, hazelnut, almond, or combinations thereof.

In another aspect, the invention provides methods for making fried-chunk food compositions. The methods comprise (1) frying food chunks in an oil at a temperature of from about 110 to 205° C. to produce fried food chunks having a moisture content of about 16% and an Aw of about 0.7; and (2) applying from about 5 to about 35% plasticizer to the fried food chunks to produce fried-chunk food compositions that have a moisture content of about 12% or less and an Aw of about 0.65 or less.

In various embodiments, the fried-chunk food compositions have a moisture content of from about 6 to about 12% and an Aw of from about 0.4 to about 0.65.

In various embodiments, the food chunks are fried in oil having a temperature of from about 110 to 205° C., preferably 150 to 195° C., and more preferably 175 to 185° C.

The plasticizer is applied to the fried food chunks using any method known to skilled artisans. In one embodiment, the plasticizer is applied to the surface of the fried chunks, typically by spraying the plasticizer onto the chunks in the required amounts. In another, the plasticizer is applied to the fried food chunks by immersing the chunks into the plasticizer. Typically, the fried food chunks are immersed for up to 30 minutes and then the excess plasticizer is drained off. The amount of plasticizer in the fried-chunk food compositions is controlled by time the chunks are immersed.

The chunks are fried for a period sufficient to obtain the desired moisture content and Aw. Typically, the chunks are fried for from about 10 seconds to about 3 minutes. The time is often dependent on chunk size and initial oil temperature, e.g., larger pieces and lower initial oil temperature results in longer fry times.

In preferred embodiments, hot chunks from a fryer are immediately coated with plasticizer, preferably heated plasticizer, most preferably heated plasticizer having a temperature of about 75° C. The coated chunks are allowed to cool to ambient room temperature, e.g., from about 20 to about 25° C., and allowed to further equilibrate in closed containers. The chunks, which have a softy meaty feel and are shelf stable, have typical analytical values as shown in Table 4.

TABLE 4

| Variables | Acceptable Range % | Preferred Range % | Target Range % |
|---|---|---|---|
| Moisture | 8-12 | 9-11 | 10 |
| Aw | 0.5-0.65 | 0.55-0.63 | 0.6 |
| Plasticizer | 5-35 | 10-30 | 12-20 |

In various embodiments, the palatability, stability, and/or sensory appeal of the chunks may be enhanced with additional flavors (e.g., by adding digest for pet foods), colors, aromas, and the like. For example, some products may have a dark appearance and therefore an unrealistic meat image, e.g., certain fish chunks. A white colorant such as titanium dioxide may be added to produce or enhance a white fish image. Other colors can be used depending on the desired fish image, e.g., pink for salmon.

In another aspect, the invention provides blended food compositions comprising (A) one or more fried-chunk food compositions comprising (1) food chunks that have been fried in oil at a temperature of from about 110 to 205° C. to produce fried food chunks having a moisture content of about 16% and an Aw of about 0.7 and (2) from about 5 to about 35% plasticizer applied to the fried food chunks, wherein the fried food chunks with applied plasticizer have a moisture content of about 12% or less and an Aw of about 0.65 or less; and (B) one or more comestible ingredients compatible with the fried-chunk food compositions.

In various embodiments, ingredients compatible with the fried-chunk food compositions have an Aw similar to that of the fried-chunk food compositions, typically with an Aw within about plus or minus 0.05 of the Aw of the fried-chunk food compositions. With similar Aw, the ingredients compatible with the fried-chunk food compositions can be blended in any desirable ratios without affecting the storage stability or aesthetic character of the blended food compositions.

In various embodiments, the comestible ingredients comprise meats, fruits, vegetables, or combinations thereof. In preferred embodiments, the ingredients have been processed to produce an ingredient with the desired Aw. In some embodiments, the comestible ingredients comprise extruded food compositions, including kibbles and treats. In other embodiments, the comestible ingredients comprise baked food compositions, including kibbles and treats.

In various embodiments, the blended ingredients and the fried food chunks have a moisture content of from about 6 to about 12% and an Aw of from about 0.4 to about 0.65. In preferred embodiments, the blended ingredients and the fried food chunks have a moisture content of from about 10 to about 12% and an Aw of from about 0.55 to about 0.65.

In one embodiment, the fried-chunk food compositions are formulated to provide "complete and balanced" nutrition for an animal, preferably a companion animal, according to standards established by the Association of American Feed Control Officials (AAFCO). In another embodiment, the food composition is a pet food composition.

In various embodiments, the animal is a companion animal, preferably a dog or a cat, most preferably a dog. In other embodiments, the animal is a human. When the animal is a human, food grade ingredients should be used, including food grade meats.

In various embodiments, the fried-chunk food compositions comprise additional ingredients such as vitamins, minerals, amino acids, nucleic acids, fillers, palatability enhancers, binding agents, flavors, stabilizers, emulsifiers, sweeteners, colorants, buffers, salts, coatings, condiments, preservatives, and the like known to skilled artisans. Non-limiting examples of supplementary minerals include calcium, phosphorous, potassium, sodium, iron, chloride, boron, copper, zinc, magnesium, manganese, iodine, selenium, and the like. Non-limiting examples of supplementary vitamins include vitamin A, any of the B vitamins, vitamin C, vitamin D, vitamin E, and vitamin K, including various salts, esters, or other derivatives of the foregoing. Additional dietary supplements may also be included, for example, any form of niacin, pantothenic acid, insulin, folic acid, biotin, amino acids, and the like, as well as salts and derivatives thereof. Stabilizers include substances that tend to increase the shelf life of the composition such as preservatives, synergists and sequestrants, packaging gases, emulsifiers, thickeners, gelling agents, and plasticizers. Examples of emulsifiers and/or thickening agents include gelatin, cellulose ethers, starch, starch esters, starch ethers, and modified starches. Selection of the ingredients and their amounts is known to skilled artisans. Specific amounts for each additional ingredient will depend on a variety of factors such as the ingredient included in the composition; the species of animal; the animal's age, body weight, general health, sex, and diet; the animal's consumption rate; the purpose for which the food composition is being administered to the animal; and the like. Therefore, the component and ingredient amounts may vary widely and may deviate from the preferred proportions described herein.

In another aspect, the invention provides a means for communicating information about or instructions for one or more of (1) the unique texture and appearance of the fried-chunk food compositions of the present invention; (2) the lack of preservatives in the fried-chunk food compositions; (3) the spoilage and shelf-stable characteristics of the fried-chunk food compositions; (4) instructions for feeding the fried-chunk food compositions or blended food compositions to animals; (5) contact information for consumers to use if they have a question about the food compositions or their use; and (6) nutritional information about the fried-chunk food compositions. Useful instructions can include feeding amounts and frequency. The communication means is useful for instructing on the benefits of using the present invention and communicating the approved methods for feeding the food compositions to an animal. The means comprises one or more of a physical or electronic document, digital storage media, optical storage media, audio presentation, audiovisual display, or visual display containing the information or instructions. Preferably, the means is selected from the group consisting of a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof.

In another aspect, the present invention provides a package comprising a fried-chunk food composition of the present invention and a label affixed to the package containing a word or words, picture, design, acronym, slogan, phrase, or other device, or combination thereof that indicates that the contents of the package contains a fried-chunk food composition with beneficial properties such as shelf stability, desirable texture, desirable appearance, and lack of preservatives. Typically, such device comprises the words "contains no preservatives", "softness assured", "shelf-stable", "no added water", or an equivalent expression printed on the package. Any package or packaging material suitable for containing the composition is useful in the invention, e.g., bag, box, bottle, can, pouch, and the like manufactured from paper, plastic, foil, metal, and the like. In a preferred embodiment, the package contains a food composition adapted for a particular animal such as a human, canine, or feline, as appropriate for the label, preferably a companion animal food composition for dogs or cats. In a preferred embodiment, the package is a retortable can or pouch comprising a fried-chunk food composition of the present invention.

EXAMPLES

The invention can be further illustrated by the following examples, although it will be understood that these examples are included merely for purposes of illustration and are not intended to limit the scope of the invention unless otherwise specifically indicated.

Example 1

For a beef variety, fried chunks having the ingredients shown in Table 1 were manufactured by the following procedure. Of the total meat and meat by-products, 50% was mechanically de-boned beef (MDB). This MDB and the remaining meat and meat by-products were passed through a grinder to reduce the meat material into pieces of substantially uniform size. The grinder was equipped with a 1 cm or smaller grinding plate. Prior to grinding, the frozen meat materials were prebroken or cut into pieces to reduce the size of the pieces going into the grinder. After grinding, the mix of meat particles was conveyed to a mixing tank in which the meat was mixed until uniform. The uniform mix of ground meat particles was then comminuted by passing through a high shear, emulsion mill. The temperature of the meat mixture during emulsification was maintained below about 49° C. to minimize protein denaturation.

The remaining dry ingredients including dry proteinaceous material (Table 1) were then mixed with the emulsified meat in a mixer to form a viscous meat emulsion. This viscous meat emulsion was then emulsified and pumped into a holding tube. The temperature was allowed to rise above the boiling point of water (132 to 154° C.) under pressure (40 to 500 psi). Under these conditions, the proteins are thermoset and the slabs were diced into 20 to 30 mm long pieces as they exited the tube. These were then screened (0.25 inch opening) to remove fines.

The hot diced chunks were then deep fried in beef tallow in a batch fryer. The tallow temperature was maintained at 175 to 185° C. through the process. In 90 seconds, the moisture of the chunks was reduced to about 16% moisture and Aw 0.7. A Decagon Aqualab water activity tester (±0.0003) was used to determine Aw. Due to the high level of glycerol, the Aqualab Volatile Sensor insert was used. The chunks were removed from the fryer and excess fat drained.

The still hot chunks (75 to 95° C.) were the sprayed with 15% heated glycerin (about 75° C.) in a tumble coater. The chunks were tumbled for an additional 3 minutes and then emptied into a holding tank and allowed to sit for 60 minutes. At times of between 30 to 60 minutes, depending on the piece sizes, all of the free glycerin was absorbed by the chunks.

The plasticized chunks were then given a flavor coating by spraying 0.5% phosphoric acid and dusting with 0.5% dried digest while it was tumbled in a coater. The coated chunks were then cooled and sealed in moisture barrier bags. The finished product had a moisture of 11.5% and Aw of 0.63. The product was flexible and soft when squeezed between the thumb and fingers. Because the Aw was lower than 0.65, no mold growth was expected. None was seen in stored products that were stored for months.

Example 2

For a chicken variety, fried chunks having the ingredients shown in Table 2 were manufactured by the following procedure. Of the total meat and meat by-products, 50% was mechanically separated chicken. The chunks were manufactured, fried, flavor coated, and packaged using the procedure given in Example 1. The moisture of the coated chunks was 11.1% and Aw was 0.62. The softness and mold stability was same as for the beef chunks in Example 1.

Example 3

The fried-chunk food composition made in Example 1 was blended with biscuit treats having an Aw of about 0.6. 20% of beef chunks were blended with 80% Alpo® brand of Snap Treats in a tumbler for about 2 minutes to obtain a uniform product. The blend is a new dual textured composition. The blend was observed to have an improved aesthetic and owner appeal.

Example 4

The fried-chunk food compositions from Examples 1 and 2 were compared to shelf stable baked and extruded biscuits available on the market. The fried-chunk food composition and the biscuits were presented in a paired comparison to 20 random mix of small/medium dogs. The results are shown in Table 5.

TABLE 5

| Products | % Consumption | Significance $p < 0.05$ |
|---|---|---|
| Fried Beef Chunks: Alpo ® Snaps | 85:15 | Significant |
| Fried Chicken Chunks: Alpo ® Snaps | 90:10 | Significant |
| Fried Beef Chunks: Milkbone ® Biscuit | 100:0 | Significant |
| Fried Chicken Chunks: Milkbone ® Biscuit | 90:10 | Significant |

Referring to Table 5, the fried-chunk food compositions were found to be significantly more palatable than the baked or extruded biscuits currently available.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

What is claimed is:

1. A method for making a fried-chunk food composition comprising:
   (1) frying food chunks in an oil at a temperature of from about 110 to 205° C. to produce fried food chunks having a moisture content of about 16% and an Aw of about 0.7; and
   (2) applying from about 5 to about 35% plasticizer to the fried food chunks to produce a fried-chunk food composition that has a moisture content of about 12% or less and an Aw of about 0.65 or less.

2. The method of claim 1 wherein the food composition has a moisture content of from about 6 to about 12% and an Aw of from about 0.4 to about 0.65.

3. The method of claim 1 wherein the food composition has a moisture content of from about 10 to about 12% and an Aw of from about 0.55 to about 0.65.

4. The method of claim 1 wherein the food composition is formulated to provide complete and balanced nutrition for an animal.

5. The method of claim 4 wherein the animal is a companion animal.

6. The method of claim 5 wherein the animal is a dog or a cat.

* * * * *